(12) United States Patent
Williams

(10) Patent No.: US 8,191,925 B2
(45) Date of Patent: Jun. 5, 2012

(54) DYNAMIC SAFETY VENT

(75) Inventor: Jeffrey D. Williams, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 139 days.

(21) Appl. No.: 12/102,581

(22) Filed: Apr. 14, 2008

(65) Prior Publication Data
US 2009/0256338 A1 Oct. 15, 2009

(51) Int. Cl.
B60R 21/276 (2006.01)
(52) U.S. Cl. .................. 280/739; 280/743.2
(58) Field of Classification Search .................. 280/739, 280/743.2
See application file for complete search history.

(56) References Cited

U.S. PATENT DOCUMENTS

| | | |
|---|---|---|
| 5,016,913 A | 5/1991 | Nakajima et al. |
| 5,172,933 A | 12/1992 | Strasser |
| 5,240,283 A | 8/1993 | Kishi et al. |
| 5,246,250 A | 9/1993 | Wolanin et al. |
| 5,280,953 A | 1/1994 | Wolanin et al. |
| 5,290,953 A | 3/1994 | Clark, Jr. et al. |
| 5,306,043 A | 4/1994 | Mihm et al. |
| 5,350,188 A | 9/1994 | Sato |
| 5,405,166 A | 4/1995 | Rogerson |
| 5,421,607 A | 6/1995 | Gordon |
| 5,492,363 A | 2/1996 | Hartmeyer et al. |
| 5,494,314 A | 2/1996 | Kriska et al. |
| 5,520,413 A | 5/1996 | Mossi et al. |
| 5,603,526 A | 2/1997 | Buchanan |
| 5,775,729 A | 7/1998 | Schneider et al. |
| 5,931,497 A | 8/1999 | Fischer |
| 5,945,184 A | 8/1999 | Nagata et al. |
| 6,056,318 A | 5/2000 | Braunschadel |
| 6,095,557 A | 8/2000 | Takimoto et al. |
| 6,126,196 A | 10/2000 | Zimmerman |
| 6,139,048 A | 10/2000 | Braunschadel |
| 6,183,003 B1 | 2/2001 | Matsuhashi et al. |
| 6,206,408 B1 | 3/2001 | Schneider |
| 6,247,726 B1 | 6/2001 | Ryan |
| 6,290,257 B1 | 9/2001 | Bunce et al. |
| 6,371,509 B1 | 4/2002 | Ellerbrok et al. |
| 6,390,501 B1 | 5/2002 | Greib et al. |
| 6,398,258 B2 | 6/2002 | Hamada et al. |

(Continued)

FOREIGN PATENT DOCUMENTS

DE 196 40 322 3/1996

(Continued)

OTHER PUBLICATIONS

Notification of Transmittal of the International Search Report and the Written Opinion of the International Searching Authority issued Apr. 9, 2009 in International Application No. PCT/US09/40031.

(Continued)

*Primary Examiner* — Eric Culbreth
(74) *Attorney, Agent, or Firm* — Sally J. Brown; Stoel Rives LLP

(57) ABSTRACT

An inflatable airbag cushion assembly with a release device, at least one vehicle sensor, at least one vent strap, and at lest one dynamic vent. The vent strap, release device, and dynamic vent operate together such that the vent can adopt at least two configurations, with one of the configurations venting less inflation gas than the other.

14 Claims, 6 Drawing Sheets

U.S. PATENT DOCUMENTS

| | | | |
|---|---|---|---|
| 6,419,267 B1 | 7/2002 | Hashimoto et al. | |
| 6,554,313 B2 | 4/2003 | Uchida | |
| 6,631,921 B1 | 10/2003 | Drossler et al. | |
| 6,631,922 B2 | 10/2003 | Hess et al. | |
| 6,648,371 B2 | 11/2003 | Vendely et al. | |
| 6,746,045 B2 | 6/2004 | Short et al. | |
| 6,773,027 B2 | 8/2004 | Bohn et al. | |
| 6,773,030 B2 | 8/2004 | Fischer | |
| 6,784,379 B2 * | 8/2004 | Breed et al. | 177/144 |
| 6,786,505 B2 | 9/2004 | Yoshida | |
| 6,832,778 B2 | 12/2004 | Pinsenschaum et al. | |
| 6,863,304 B2 | 3/2005 | Reiter et al. | |
| 6,918,613 B2 | 7/2005 | Short et al. | |
| 6,932,385 B2 | 8/2005 | Hawthorn et al. | |
| 6,962,363 B2 | 11/2005 | Wang | |
| 6,971,664 B2 | 12/2005 | Amamori | |
| 6,971,671 B2 | 12/2005 | Schneider et al. | |
| 7,059,634 B2 | 6/2006 | Bossecker et al. | |
| 7,066,487 B2 | 6/2006 | Sullivan | |
| 7,083,191 B2 | 8/2006 | Fischer | |
| 7,083,192 B2 | 8/2006 | Fischer et al. | |
| 7,195,281 B2 | 3/2007 | Williams et al. | |
| 7,210,702 B2 | 5/2007 | Soderquist | |
| 7,237,802 B2 | 7/2007 | Rose et al. | |
| 7,261,319 B2 | 8/2007 | DePottey et al. | |
| 7,328,915 B2 | 2/2008 | Smith et al. | |
| 7,347,450 B2 | 3/2008 | Williams et al. | |
| 7,360,789 B2 | 4/2008 | Bito | |
| 7,364,192 B2 | 4/2008 | Braun et al. | |
| 7,377,548 B2 | 5/2008 | Bauer et al. | |
| 7,413,218 B2 * | 8/2008 | Ekdahl | 280/739 |
| 7,441,805 B2 | 10/2008 | Jamison | |
| 7,556,290 B2 | 7/2009 | Williams et al. | |
| 7,568,729 B2 | 8/2009 | Schnieder et al. | |
| 7,597,355 B2 | 10/2009 | Williams et al. | |
| 7,597,356 B2 | 10/2009 | Williams | |
| 7,604,252 B2 | 10/2009 | Heitpltaz et al. | |
| 7,607,689 B2 * | 10/2009 | Kalczynski et al. | 280/739 |
| 7,614,653 B2 | 11/2009 | Rose et al. | |
| 7,614,654 B2 | 11/2009 | Williams | |
| 7,654,561 B2 | 2/2010 | Webber et al. | |
| 7,673,899 B2 | 3/2010 | Abe | |
| 7,722,080 B2 | 5/2010 | Rose | |
| 7,748,738 B2 | 7/2010 | Schneider | |
| 7,762,576 B2 | 7/2010 | Cho | |
| 7,770,926 B2 | 8/2010 | Schneider | |
| 7,784,828 B2 | 8/2010 | Mills et al. | |
| 7,938,445 B2 | 5/2011 | Smith et al. | |
| 7,946,613 B2 | 5/2011 | Rose et al. | |
| 2002/0117840 A1 | 8/2002 | Dunkle et al. | |
| 2003/0020266 A1 | 1/2003 | Vendely et al. | |
| 2003/0020268 A1 | 1/2003 | Reiter et al. | |
| 2003/0030254 A1 | 2/2003 | Hasebe | |
| 2003/0057691 A1 | 3/2003 | Tokita et al. | |
| 2003/0127839 A1 | 7/2003 | Jenkins | |
| 2003/0209895 A1 | 11/2003 | Gu | |
| 2003/0214125 A1 | 11/2003 | Schneider et al. | |
| 2004/0012179 A1 | 1/2004 | Pinsenschaum | |
| 2004/0056459 A1 | 3/2004 | Kassman et al. | |
| 2004/0090054 A1 | 5/2004 | Bossecker et al. | |
| 2004/0130135 A1 | 7/2004 | Ekdahl | |
| 2004/0188990 A1 | 9/2004 | Short et al. | |
| 2004/0256842 A1 | 12/2004 | Breed et al. | |
| 2005/0040634 A1 | 2/2005 | Braun et al. | |
| 2005/0052008 A1 | 3/2005 | Rose et al. | |
| 2005/0057027 A1 | 3/2005 | Fogle et al. | |
| 2005/0098990 A1 * | 5/2005 | Pinsenschaum et al. | 280/739 |
| 2005/0236822 A1 | 10/2005 | Rose et al. | |
| 2005/0248137 A1 | 11/2005 | Delventhal et al. | |
| 2006/0001244 A1 | 1/2006 | Taguchi et al. | |
| 2006/0071461 A1 * | 4/2006 | Williams et al. | 280/739 |
| 2006/0071462 A1 | 4/2006 | Smith et al. | |
| 2006/0151979 A1 | 7/2006 | DePottey et al. | |
| 2006/0197327 A1 | 9/2006 | Maripudi et al. | |
| 2006/0202454 A1 | 9/2006 | Parizal et al. | |
| 2006/0284404 A1 * | 12/2006 | Green et al. | 280/743.2 |
| 2007/0045997 A1 | 3/2007 | Abe et al. | |
| 2007/0052222 A1 | 3/2007 | Higuchi et al. | |
| 2007/0108750 A1 | 5/2007 | Bauer et al. | |
| 2007/0126218 A1 | 6/2007 | Schnieder et al. | |
| 2007/0126219 A1 | 6/2007 | Williams | |
| 2007/0132222 A1 | 6/2007 | Thomas et al. | |
| 2007/0205590 A1 | 9/2007 | Klinkenberger et al. | |
| 2007/0216146 A1 | 9/2007 | Williams | |
| 2008/0007038 A1 | 1/2008 | Fischer et al. | |
| 2008/0018086 A1 | 1/2008 | Ford et al. | |
| 2008/0023950 A1 | 1/2008 | Kalczynski et al. | |
| 2008/0023959 A1 | 1/2008 | Crawford | |
| 2008/0073890 A1 | 3/2008 | Williams et al. | |
| 2008/0073891 A1 | 3/2008 | Rose et al. | |
| 2008/0073892 A1 | 3/2008 | Rose et al. | |
| 2008/0073893 A1 | 3/2008 | Schneider | |
| 2008/0079250 A1 | 4/2008 | Boyle et al. | |
| 2008/0203713 A1 | 8/2008 | McFadden et al. | |
| 2008/0303256 A1 | 12/2008 | Williams | |
| 2009/0039630 A1 | 2/2009 | Schnieder et al. | |
| 2009/0230663 A1 | 9/2009 | Mills et al. | |
| 2009/0256338 A1 | 10/2009 | Williams | |
| 2010/0225094 A1 | 9/2010 | Rose et al. | |
| 2010/0225095 A1 | 9/2010 | Smith et al. | |
| 2011/0031725 A1 | 2/2011 | Rose et al. | |

FOREIGN PATENT DOCUMENTS

| | | |
|---|---|---|
| DE | 10059956 | 6/2002 |
| EP | 0 458 838 | 5/1996 |
| EP | 1398228 | 3/2004 |
| EP | 1824710 | 6/2009 |
| EP | 1960240 | 8/2011 |
| GB | 2328646 | 3/1999 |
| JP | 03-281460 | 12/1991 |
| JP | 05085295 | 4/1993 |
| JP | 08268213 | 10/1996 |
| JP | 2001-158315 | 6/2001 |
| JP | 2003-137060 | 4/2003 |
| JP | 2004-262432 | 9/2004 |
| WO | WO-2004/045919 | 6/2004 |
| WO | WO 2006/041547 | 4/2006 |
| WO | WO 2006/041552 | 4/2006 |
| WO | WO 2006/073534 | 7/2006 |
| WO | WO 2007/067371 | 6/2007 |
| WO | WO 2007/067377 | 6/2007 |
| WO | WO 2009/020786 | 8/2009 |
| WO | WO 2008/150578 | 12/2009 |
| WO | WO-2010/101673 | 9/2010 |

OTHER PUBLICATIONS

Office Action issued Mar. 15, 2006 in U.S. Appl. No. 10/832,843, now U.S. Patent No. 7,237,802.

Response to First Office Action filed Jun. 19, 2006 in U.S. Appl. No. 10/832,843, now U.S. Patent No. 7,237,802.

Notice of Allowance and Fee(s) Due issued Jun. 22, 2006 in U.S. Appl. No. 10/832,843, now U.S. Patent No. 7,237,802.

Request for Continued Examination filed Sep. 20, 2006 in U.S. Appl. No. 10/832,843, now U.S. Patent No. 7,237,802.

Notice of Allowance and Fee(s) Due issued Oct. 3, 2006 in U.S. Appl. No. 10/832,843, now U.S. Patent No. 7,237,802.

Office Action issued Jun. 27, 2006 in U.S. Appl. No. 10/959,387, now U.S. Patent No. 7,328,915.

Interview Summary issued Jan. 30, 2007 in U.S. Appl. No. 10/959,387, now U.S. Patent No. 7,328,915.

Amendment and Response to Office Action filed Feb. 20, 2007 in U.S. Appl. No. 10/959,387, now U.S. Patent No. 7,328,915.

Office Action issued May 2, 2007 in U.S. Appl. No. 10/959,387, now U.S. Patent No. 7,328,915.

Amendment and Response to Office Action filed Aug. 7, 2007 in U.S. Appl. No. 10/959,387, now U.S. Patent No. 7,328,915.

Notice of Allowance issued Oct. 5, 2007 in U.S. Appl. No. 10/959,387, now U.S. Patent No. 7,328,915.

Preliminary Amendment filed Mar. 10, 2005 in U.S. Appl. No. 10/959,256, now U.S. Patent No. 7,347,450.

Office Action issued Nov. 15, 2006 in U.S. Appl. No. 10/959,256, now U.S. Patent No. 7,347,450.

Interview Summary issued Jan. 23, 2007 in U.S. Appl. No. 10/959,256, now U.S. Patent No. 7,347,450.

Amendment and Response to Office Action filed Feb. 15, 2007 in U.S. Appl. No. 10/959,256, now U.S. Patent No. 7,347,450.
Office Action issued May 21, 2007 in U.S. Appl. No. 10/959,256, now U.S. Patent No. 7,347,450.
Amendment and Response to Office Action filed Aug. 17, 2007 in U.S. Appl. No. 10/959,256, now U.S. Patent No. 7,347,450.
Notice of Allowance and Fee(s) Due issued Nov. 27, 2007 in U.S. Appl. No. 10/959,256, now U.S. Patent No. 7,347,450.
Restriction Requirement issued Apr. 7, 2008 in U.S. Appl. No. 11/295,953, now U.S. Patent No. 7,568,729.
Response to Restriction Requirement filed Apr. 24, 2008 in U.S. Appl. No. 11/295,953, now U.S. Patent No. 7,568,729.
Office Action issued Jul. 1, 2008 in U.S. Appl. No. 11/295,953, now U.S. Patent No. 7,568,729.
Terminal Disclaimer and Amendment and Response to Office Action filed Dec. 1, 2008 in U.S. Appl. No. 11/295,953, now U.S. Patent No. 7,568,729.
Approval of Terminal Disclaimed issued in U.S. Appl. No. 11/295,953, now U.S. Patent No. 7,568,729.
Notice of Allowance and Fee(s) Due issued Apr. 2, 2009 in U.S. Appl. No. 11/295,953, now U.S. Patent No. 7,568,729.
Office Action issued Jun. 4, 2007 in U.S. Appl. No. 11/296,031, now U.S. Patent No. 7,614,654.
Amendment and Response to Office Action filed Dec. 4, 2007 in U.S. Appl. No. 11/296,031, now U.S. Patent No. 7,614,654.
Office Action issued Apr. 21, 2008 in U.S. Appl. No. 11/296,031, now U.S. Patent No. 7,614,654.
Amendment and Response to Office Action filed Jul. 21, 2008 in U.S. Appl. No. 11/296,031, now U.S. Patent No. 7,614,654.
Interview Summary issued Dec. 17, 2008 in U.S. Appl. No. 11/296,031, now U.S. Patent No. 7,614,654.
Office Action issued Oct. 21, 2008 in U.S. Appl. No. 11/296,031, now U.S. Patent No. 7,614,654.
Notice of Allowance and Fee(s) Due issued Jul. 29, 2009 in U.S. Appl. No. 11/296,031, now U.S. Patent No. 7,614,654.
Supplemental Notice of Allowability issued Sep. 2, 2009 in U.S. Appl. No. 11/296,031, now U.S. Patent No. 7,614,654.
Office Action issued Jul. 11, 2008 in U.S. Appl. No. 11/528,118, now U.S. Patent No. 7,556,290.
Amendment and Response to Office Action issued Nov. 25, 2008 in U.S. Appl. No. 11/528,118, now U.S. Patent No. 7,556,290.
Interview Summary issued Dec. 15, 2008 in U.S. Appl. No. 11/528,118, now U.S. Patent No. 7,556,290.
Notice of Allowance and Fee(s) Due issued Feb. 10, 2009 in U.S. Appl. No. 11/528,118, now U.S. Patent No. 7,556,290.
Request for Continued Examination filed Mar. 6, 2009 in U.S. Appl. No. 11/528,118, now U.S. Patent No. 7,556,290.
Notice of Allowance and Fee(s) Due issued Mar. 23, 2009 in U.S. Appl. No. 11/528,118, now U.S. Patent No. 7,556,290.
Office Action issued Jun. 30, 2008 in U.S. Appl. No. 11/528,266, now U.S. Patent No. 7,722,080.
Amendment and Response to Office Action in U.S. Appl. No. 11/528,266, now U.S. Patent No. 7,722,080.
Interview Summary issued Dec. 16, 2008 in U.S. Appl. No. 11/528,266, now U.S. Patent No. 7,722,080.
Summary of Interview filed Jan. 16, 2009 in U.S. Appl. No. 11/528,266, now U.S. Patent No. 7,722,080.
Request for Continued Examination filed Mar. 6, 2009 in U.S. Appl. No. 11/528,266, now U.S. Patent No. 7,722,080.
Office Action issued Mar. 19, 2009 in U.S. Appl. No. 11/528,266, now U.S. Patent No. 7,722,080.
Terminal Disclaimer and Amendment and Response to Office Action filed Sep. 9, 2009 in U.S. Appl. No. 11/528,266, now U.S. Patent No. 7,722,080.
Disapproval of Terminal Disclaimer issued in U.S. Appl. No. 11/528,266, now U.S. Patent No. 7,722,080.
Terminal Disclaimer filed Oct. 19, 2009 in U.S. Appl. No. 11/528,266, now U.S. Patent No. 7,722,080.
Office Action issued Oct. 21, 2009 in U.S. Appl. No. 11/528,266, now U.S. Patent No. 7,722,080.
Approval of Terminal Disclaimer issued in U.S. Appl. No. 11/528,266, now U.S. Patent No. 7,722,080.
Notice of Allowance and Fee(s) Due issued Dec. 16, 2009 in U.S. Appl. No. 11/528,266, now U.S. Patent No. 7,722,080.
Notice of Improper Request for Continued Examination issued Jan. 28, 2010 in U.S. Appl. No. 11/528,266, now U.S. Patent No. 7,722,080.
Office Action issued Jan. 2, 2009 in U.S. Appl. No. 11/528,042, now U.S. Patent No. 7,748,738.
Amendment and Response to Office Action filed Jul. 2, 2009 in U.S. Appl. No. 11/528,042, now U.S. Patent No. 7,748,738.
Notice of Allowance and Fee(s) Due issued Nov. 5, 2009 in U.S. Appl. No. 11/528,042, now U.S. Patent No. 7,748,738.
Office Action issued Nov. 12, 2009 in U.S. Appl. No. 11/528,265, now U.S. Patent No. 7,614,653.
Supplemental Office Action issued Nov. 18, 2008 in U.S. Appl. No. 11/528,265, now U.S. Patent No. 7,614,653.
Notice of Allowance and Fee(s) Due issued Jun. 16, 2009 in U.S. Appl. No. 11/528,265, now U.S. Patent No. 7,614,653.
Office Action issued Nov. 17, 2008 in U.S. Appl. No. 11/589,316, now U.S. Patent No. 7,597,355.
Interview Summary issued Dec. 19, 2008 in U.S. Appl. No. 11/589,316, now U.S. Patent No. 7,597,355.
Amendment and Response to Office Action filed Apr. 17, 2009 in U.S. Appl. No. 11/589,316, now U.S. Patent No. 7,597,355.
Notice of Allowance and Fee(s) Due issued Jun. 17, 2009 in U.S. Appl. No. 11/589,316, now U.S. Patent No. 7,597,355.
Office Action issued Dec. 2, 2008 in U.S. Appl. No. 11/758,419, now U.S. Patent No. 7,597,356.
Interview Summary issued Mar. 17, 2009 in U.S. Appl. No. 11/758,419, now U.S. Patent No. 7,597,356.
Amendment and Response to Office Action filed ,Apr. 21, 2009 in U.S. Appl. No. 11/758,419, now U.S. Patent No. 7,597,356.
Notice of Allowance and Fee(s) Due issued Jun. 19, 2009 in U.S. Appl. No. 11/758,419, now U.S. Patent No. 7,597,356.
Office Action issued Sep. 4, 2009 in U.S. Appl. No. 11/836,499, now U.S. Patent No. 7,770,926.
Amendment and Response to Office Action filed Mar. 1, 2010 in U.S. Appl. No. 11/836,499, now U.S. Patent No. 7,770,926.
Interview Summary issued Mar. 15, 2010 in U.S. Appl. No. 11/836,499, now U.S. Patent No. 7,770,926.
Notice of Allowance and Fee(s) due issued Apr. 16, 2010 in U.S. Appl. No. 11/836,499, now U.S. Patent No. 7,770,926.
Office Communication issued Jun. 25, 2010 in U.S. Appl. No. 11/836,499, now U.S. Patent No. 7,770,926.
Office Action issued Dec. 28, 2009 in U.S. Appl. No. 12/046,014, now U.S. Patent No. 7,784,828.
Amendment and Response to Office Action filed Mar. 29, 2010 in U.S. Appl. No. 12/046,014, now U.S. Patent No. 7,784,828.
Notice of Allowance and Fee(s) Due issued May 6, 2010 in U.S. Appl. No. 12/046,014, now U.S. Patent No. 7,784,828.
Restriction Requirement issued Jul. 21, 2010 in co-pending U.S. Appl. No. 12/397,019.
Notification of Transmittal of the International Search Report and the Written Opinion of the International Searching Authority issued Oct. 19, 2006 in International Application No. PCT/US2005/025416.
Notification of Transmittal of the International Search Report and the Written Opinion of the International Searching Authority issued Dec. 15, 2006 in International Application No. PCT/US2005/027255.
Notification of Transmittal of the International Search Report and the Written Opinion of the International Searching Authority issued Aug. 20, 2007 in International Application No. PCT/US2006/045367.
Notification of Transmittal of the International Search Report and the Written Opinion of the International Searching Authority issued Sep. 5, 2007 in International Application No. PCT/US2006/045441.
Notification of Transmittal of the International Search Report and the Written Opinion of the International Searching Authority issued Mar. 9, 2007 in International Application No. PCT/US2005/038175.
Notification of Transmittal of the International Search Report and the Written Opinion of the International Searching Authority issued Oct. 22, 2008 in International Application No. PCT/US2008/071337.

Notification of Transmittal of the International Search Report and the Written Opinion of the International Searching Authority issued Aug. 15, 2008 in International Application No. PCT/US2008/060226.

Notification of Transmittal of the International Search Report and the Written Opinion of the International Searching Authority issued Mar. 29, 2010 in International Application No. PCT/US2010/021341.

Amendment and Response to Requirement for Election of Species filed Aug. 23, 2010 in co-pending U.S. Appl. No. 12/397,019, now published as US-2010/0225094.

Office Action mailed Sep. 17, 2010 in co-pending U.S. Appl. No. 12/397,019, now published as US-2010/0225094.

Amendment and Response to Office Action filed Jan. 6, 2011 in co-pending U.S. Appl. No. 12/397,019, now published as US-2010/0225094.

Terminal Disclaimer and Response to Office Action filed Jan. 10, 2011 in co-pending U.S. Appl. No. 12/397,251, now published as US-2010/0225095.

Notice of Allowance mailed Mar. 16, 2011 in co-pending U.S. Appl. No. 12/397,019, now issued as United States Patent No. 7,946,613.

Notice of Allowance mailed Mar. 21, 2011 in co-pending U.S. Appl. No. 12/397,251, now issued as United States Patent No. 7,938,445.

Extended European Search Report dated May 4, 2010 in corresponding European patent application No. 06838372.8, now issued as European Patent No. 1,960,240.

Supplementary European Search Report dated Nov. 7, 2007 in European patent application No. 05777506.6, now issued as European Patent No. 1,824,710.

\* cited by examiner

DYNAMIC SAFETY VENT

TECHNICAL FIELD

The present invention relates generally to the field of automotive protective systems. More specifically, the present invention relates to a system for selectively venting inflation gases from an inflatable airbag cushion.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which.

Figure 1:
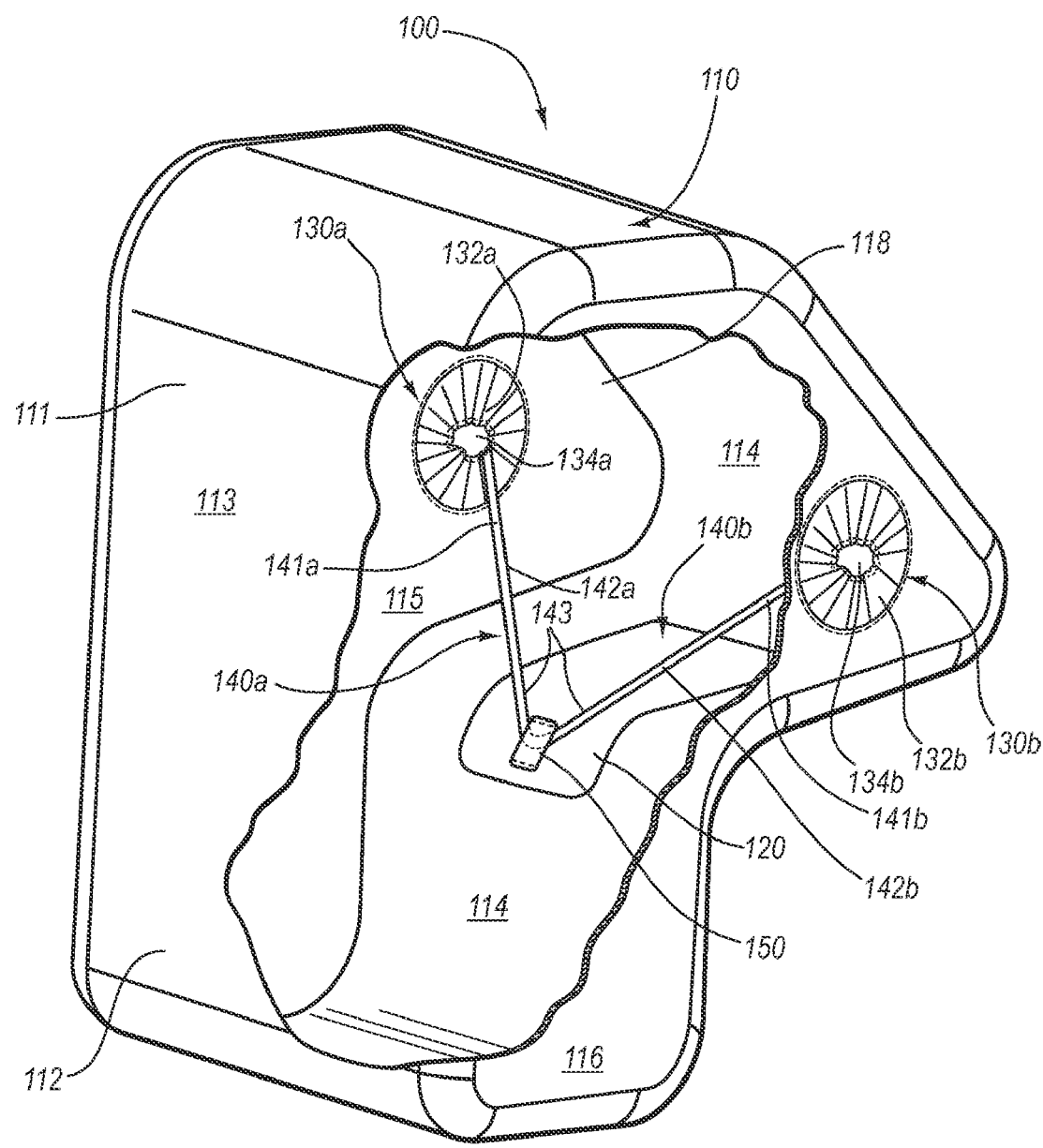
FIG. 1 is a perspective view of an embodiment of an inflatable airbag assembly with dynamic vents, wherein the airbag assembly is partially cutaway and the dynamic vents are in a constricted state.

INDEX OF ELEMENTS IDENTIFIED IN THE DRAWINGS 100 inflatable cushion air bag assembly
110 cushion membrane
111 upper portion
112 lower portion
113 front face
114 rear face
115 first side face
116 second side face
118 inflatable void
120 housing with inflator
130 dynamic vent
132 vent side panel
133 stitching
134 vent aperture
135 vent rim
136 vent seam
137a-b vent strap seam
138 vent strap channel
139 vent strap aperture
140 vent strap
141 first portion of strap
142 second portion of strap
143 third portion of strap
150 strap release device
151 body of release device
152 aperture of release device
153 blade
154 edge of blade
155 initiator
156 blade slot
400 inflatable cushion airbag assembly
410 airbag membrane
430 dynamic vent
432 vent side panel
434 vent aperture
435 vent rim
436 vent seam
437 a-b vent strap seam
438 vent strap channel
440 vent strap
441 first portion of strap

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to", "coupled to" and "in communication with" refer to any form of interaction between two or more entities, including mechanical, electrical, magnetic, electromagnetic, fluid and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the packaged state behind a cover. During a collision event, vehicle sensors trigger the activation of an inflator, which rapidly fills the airbag with inflation gas. Thus the airbag rapidly changes confirmations from the rolled/folded configuration to an expanded configuration.

Since an airbag may provide cushioning for occupants with a range of sizes and seating positions, it is advantageous for an airbag to be able to deploy with a hardness that is suitable for the occupant's cushioning requirements. For example, when an occupant is out of position, seated too closely to a surface from which an airbag will deploy, or has a small stature, it is advantageous for an airbag to have a soft cushion. The hardness of an airbag cushion membrane may be modulated by selective venting of inflation gas from inside the cushion to outside the cushion.

FIG. 1 depicts one embodiment of an airbag assembly 100 from a perspective view, in which an airbag cushion membrane 110 is partially cutaway. Airbag assembly 100 may comprise an inflatable cushion membrane 110, a housing 120 with an inflator, at least one dynamic vent 130, at least one vent strap 140, and a release device 150. In an undeployed state, assembly 100 may be configured to be packaged and mounted within an instrument panel or steering wheel located at the front of a vehicle. Upon detection of predetermined vehicle conditions by one or more vehicle sensors, cushion 110 may deploy out of the instrument panel or steering wheel toward an intended occupant position in a passenger seat.

According to the embodiment depicted in FIG. 1, cushion 110 has an upper portion 111a lower portion 112; a front face 113; a rear face 114; a first side face 115; and a second side face 116. The various faces of cushion membrane 110 define an interior inflatable void 118, which is in fluid communication with an inflator (not shown). Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the top portion of the cushion.

As will be appreciated by those skilled in the art, a variety of types and configurations of airbag cushion membranes can be utilized without departing from the scope and spirit of the present invention. For example, the size, shape, and proportions of the cushion membrane may vary according to its use in different vehicles or different locations within a vehicle such that the cushion may comprise an inflatable curtain cushion; a rear passenger side airbag; a driver's airbag; and/or a front passenger airbag. Also, the cushion membrane may comprise one or more of any material well known in the art, such as a woven nylon fabric. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

One skilled in the art will also appreciate that retention of inflation gas within the cushion can be modulated by the presence of one or more fixed or discrete vents, which are configured to allow for inflation gas to exit the interior of the cushion. Further, in order for a fully inflated shape of an airbag cushion membrane to adopt a predetermined shape, internal and external tethers may be used, wherein the tethers limit the expansion of the airbag and restrict it to a specific shape. Tethers are typically coupled to one or more surfaces of a cushion membrane and extend to another surface of the cushion, the airbag housing, or a vehicle structure.

Housing 120 may comprise a metal container that is fixedly attached to cushion 100 via a throat portion of the cushion. Housing 120 is configured to be mounted within a vehicle and serves to specifically position airbag assembly 100 so that the cushion may deploy with predetermined characteristics. In the packaged, undeployed state, cushion 110 is contained within housing 120. Housing 120 is configured to allow for fluid communication between void 118 of cushion 110 and an inflator (not shown). The inflator is configured to be activated in response to predetermined vehicle conditions as determined by vehicle sensors. Upon activation, the inflator rapidly generates or releases inflation gas, which forces the airbag cushion through the cosmetic cover and rapidly inflates the cushion. The inflator may be one of several types, such as pyrotechnic, stored gas, or a combination inflator. Additionally, the inflator may comprise a single or multistage inflator.

As will be appreciated by those skilled in the art, a variety of types and configurations of airbag housings can be utilized without departing from the scope and spirit of the present invention. For example, in one embodiment, the housing comprises fabric that may or may not further comprise a mounting structure. Also, the housing may have an integrated inflator, or the housing may be used to mount the inflator with the vehicle. Alternatively, the housing may not connect to the inflator and a path of inflation gas travel may not flow through the housing. Additionally, in the packaged state, a deployment flap may be disposed between the inflatable cushion membrane and a top portion of the housing, which may comprise a cosmetic cover. During airbag deployment, the deployment flap may function to protect the cushion membrane from damage caused by the housing, cosmetic cover edges, or other structures disposed near the housing and in the path of the deploying cushion membrane.

FIG. 1 depicts dynamic vents 130a-b, each of which comprises a vent side panel 132 and a vent aperture 134. Vents 130a-b may comprise cinch tube type vents and may comprise the same type of material from which cushion 110 is manufactured. Vents 130a-b may be disposed on first and second sides 115 and 116 of cushion 110 and are configured such that they may selectively vent inflation gas from void 118 of cushion 110 to outside cushion 110. As depicted in FIG. 1, vents 130a-b are held in a constricted state by tethers 140a-b, wherein side panels 132a-b are substantially flush with first and second sides 115 and 116. When in the constricted state, vents 130a-b comprise vent apertures 134a-b, which have a predetermined diameter and capacity to vent inflation gas. By way of example, and not of limitation, when in the constricted state, vent apertures 134a-b may comprise a diameter of about 15 mm. In response to predetermined occupant, vehicle, or a combination of occupant and vehicle conditions, vents 130a-b may adopt an open state that allows an increased venting capacity than that depicted in FIG. 1.

As will be appreciated by those skilled in the art, the diameter of the vent aperture in the constricted state may be varied to accomplish varied levels of inflation gas venting. For example, in one embodiment, the diameter of the aperture of the vent in the constricted state can allow for a volume of inflation gas venting that is approximately equal to one or more fixed vents, such that the fixed vent may be omitted from the airbag cushion membrane.

Vent straps 140a-b may comprise nylon webbing and typically extend from vents 130a-b to release device 150. Straps 140a-b may be described as having first, second, and third portions 141, 142, and 143, wherein the first portion is coupled to vent side panel 132 of vent 130; the second portion extends to release device 150; and the third portion is coupled to the release device. Vent straps 140a-b may comprise a single contiguous piece and the vent straps may be coupled to release device 150 by being threaded through an aperture in the release device. Thus, third portions 143 may comprise one contiguous member that is threaded through an aperture in release device 150. Vent straps 140a-b are configured to be of such a length that they are put under tension when airbag membrane 110 is in a deployed configuration and the straps are coupled to the release device. Tension in vent straps 140*a-b* may cause vents 130*a-b* to adopt the constricted state, wherein side panels 132*a-b* are cinched and oriented toward interior void 118 of cushion 110.

As will be appreciated by those skilled in the art, a variety of types and configurations of vent straps can be utilized without departing from the scope and spirit of the present invention. For example, in one embodiment the vent straps comprise cords of synthetic fibers. Additionally, one vent strap may be coupled to one vent and a vent distal portion of the strap may be coupled to the release device. Further, more than one strap may be coupled to each vent.

Figure 2:
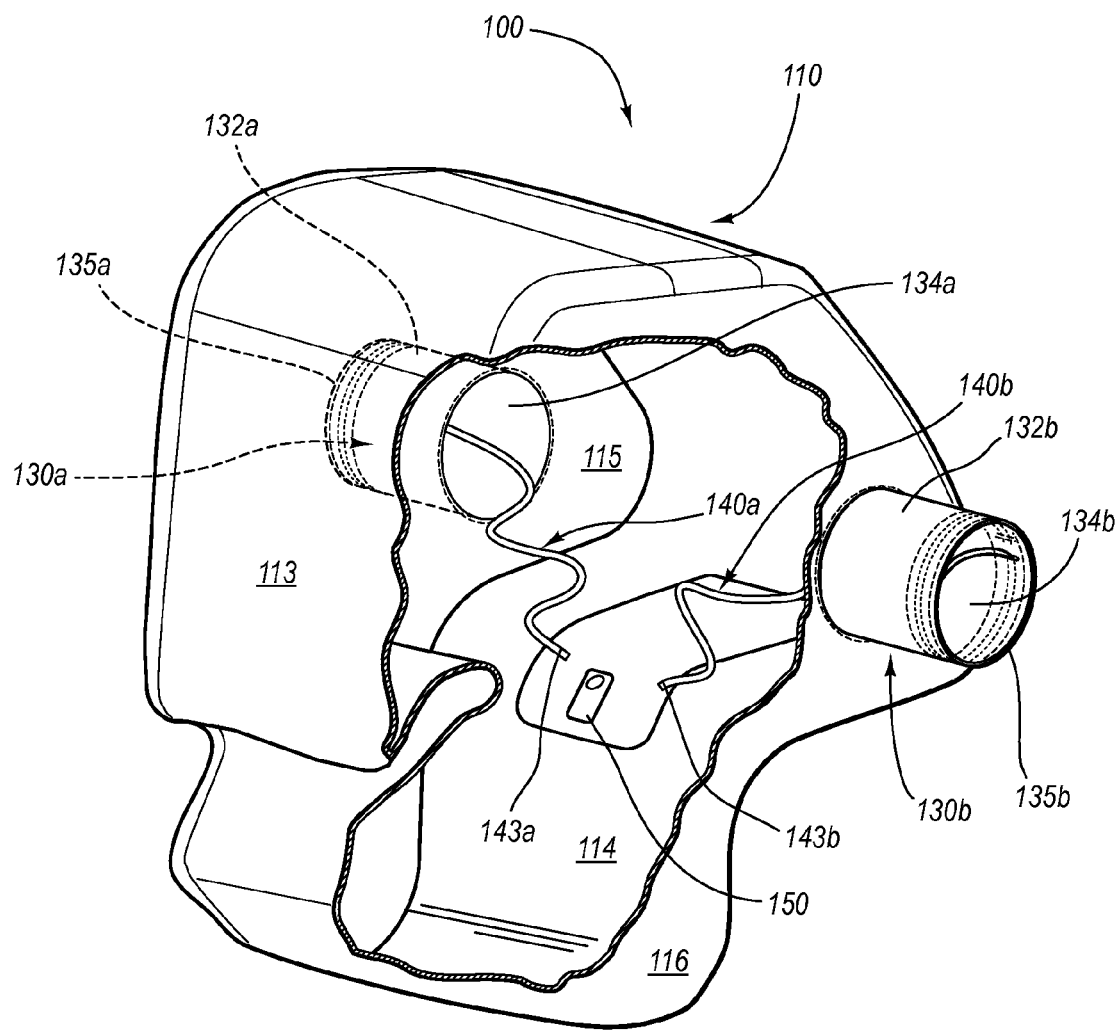
FIG. 2 is a perspective view of the inflatable airbag assembly shown in FIG. 1, wherein the airbag assembly is partially cutaway and the dynamic vents are in an open state.

Release device 150 may be attached to housing 120 and comprises an actuator of a type familiar to one skilled in the art. Release device 150 is in electronic communication with one or more vehicle sensors, wherein the detection of predetermined occupant characteristics, vehicle conditions, or a combination of occupant and vehicle conditions dictates whether the release device will release vent straps 140*a-b*. In one embodiment, the third portions of straps may form loop structures, which surround a slideable pin in the release device. If vehicle sensors determine that the release device should not release the vent tethers, the slideable pin does not move and retains the vent straps as depicted in FIG. 1. If the sensors appreciate predetermined conditions which indicate a need for increased cushion venting, upon cushion 110 deployment, the release device may release vent straps 140*a-b*, which may allow vents 130*a-b* to adopt an open state, as depicted in FIG. 2.

As will be appreciated by those skilled in the art, one or more vehicle sensors of a variety of types and configurations can be utilized to detect a single occupant characteristic, a set of occupant characteristics, or a combination of one or more occupant characteristics and vehicle conditions. These occupant and/or vehicle conditions may comprise a set of predetermined conditions that can be used to dictate whether the release device releases the vent straps. For example, in one embodiment, a seat rail sensor is utilized to detect how close or far away from an airbag deployment surface an occupant's seat is positioned. In another embodiment, a seat scale may be used to determine whether an occupant is occupying the seat and if so, ascertain an approximate weight of the occupant. In yet another embodiment an optical or infrared sensor may be used to determine an occupant's approximate surface area and/or distance from an airbag deployment surfaces. In another embodiment, an accelerometer is employed to measure the magnitude of negative acceleration experienced by a vehicle, which may indicate whether an accident has occurred and the severity of the accident. Additionally, a combination of these and other suitable sensor types may be used.

As will be appreciated by those skilled in the art, a variety of types and configurations of vent strap release devices can be utilized without departing from the scope and spirit of the present invention. For example, in one embodiment, the release device comprises a strap cutter, wherein a blade is actuated by inflation gas from the inflator or by a separate pyrotechnic or electric device. Additionally, several methods and techniques of coupling the vent straps to the release device may be employed, such as tying, gluing, and using hardware including one or more bolts, screws, pins, or bands.

Airbag assembly 100 is configured to provide variable venting based on whether specific predetermined occupant and/or vehicle conditions exist during an accident. For example, sensors may detect whether an occupant is sitting in a vehicle seat, how close the seat is positioned to an airbag deployment surface, and the weight and surface area of the occupant. If sensors determine that an occupant is present in a seat and has a weight and/or surface area that is above a predetermined threshold, that the occupant is positioned beyond a predetermined distance from an airbag deployment surface, or that an acceleration event is generating a predetermined range of negative acceleration, in case of cushion 110 deployment, release device 150 may not release vent straps 140*a-b*.

If release device 150 does not release vent straps 140*a-b*, then upon cushion 110 deployment, the straps will be placed under tension, which will cause vents 130*a-b* to adopt a constricted state. When vents 130*a-b* are in the constricted state, less inflation gas is allowed to be vented from the inflatable void 118 of cushion 110 to outside the cushion, and the cushion is more firm than if the vents were in the open state.

FIG. 2 is a perspective view of airbag assembly 100 as shown in FIG. 1, wherein vent straps 140*a-b* have been released from release device 150 and vents 130*a-b* have adopted the open state. FIG. 2 may represent a different airbag 110 deployment event than that depicted in FIG. 1, or FIG. 2 may represent a point in time subsequent to that depicted in FIG. 1, such that FIGS. 1 and 2 depict the same cushion deployment event. In other words, the decision whether to release the vent straps may be communicated by the sensor to the release device before and/or during airbag cushion deployment.

If vehicle sensors determine that no occupant is present in a seat, the occupant has a small weight and/or surface area; is positioned within a predetermined distance from an airbag deployment surface; and/or that an acceleration event is generating a predetermined range of negative acceleration, release device 150 may release third portions 143*a-b* of vent straps 140*a-b*. This allows any tension on straps 140*a-b* to be released; due to the lack of tension and positive pressure of the inflation gas within cushion 110, vent side panels 132*a-b* may be inverted and pushed to the outside of the cushion, as depicted in FIG. 2. Thus, vents 130*a-b* may adopt the open state, wherein their capacities to vent inflation gas are increased and cushion 110 is softened compared to a deployment with the vents in the constricted state.

Vent side panels 132*a-b* in the open state may comprise a full diameter of the aperture formed in cushion 110 first and second side faces 115 and 116. Likewise, vent rims 135*a-b*, which are drawn in towards themselves by vent tethers 140*a-b* in the constricted state may be free to open to a full diameter of vent apertures 134*a-b*. Thus, vent apertures 134*a-b*, which are defined by rims 135*a-b* in the constricted state may be enlarged when vents 130*a-b* change from the constricted state to the open state.

Without departing from the scope and spirit of the present invention, those skilled in the art will appreciate that the sensors, release device, vent straps, and dynamic vents may be configured in a variety of ways such that each vent may adopt a plurality of configurations ranging from the constricted state to the open state. For example, a plurality of vent straps may be independently coupled to each vent and one or more release device, wherein each vent strap can constrict the vent to varying degrees. Further, a single vent strap may be coupled multiple times to a release device such that upon iterative operation of the release device the vent strap is lengthened.

Figure 3A:
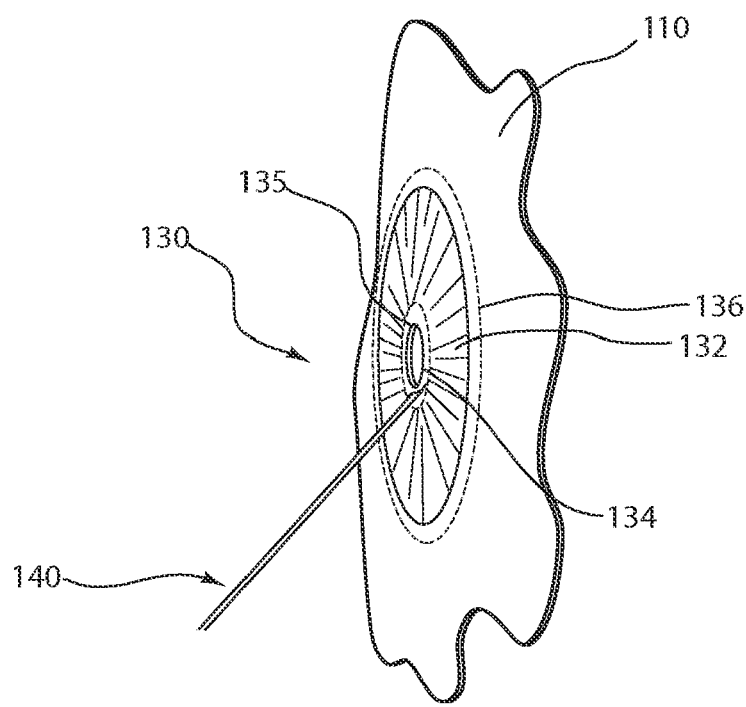
FIG. 3A is a close up perspective view of one of the dynamic vents shown in FIG. 1, wherein the vent is in a constricted state.

FIG. 3A is a close up perspective view of one of the dynamic vents shown in FIG. 1, wherein vent 130 is in the constricted state. Vent 130 may be embodied with a generally cylindrical shape. Vent 130 is disposed over an aperture in cushion membrane 110 and is attached to the cushion via a seam 136. The aperture in cushion membrane 110 may comprise the full diameter of vent 130 at seam 136, or may comprise a smaller diameter than the vent at the seam. Vent strap 140 is under tension, and as it runs through vent side panel 132 adjacent to vent rim 125, the vent rim is gathered and partially pulled together, thereby constricting the flow of inflation gas through vent aperture 134. In the constricted state, vent 130 may be described as being substantially flattened and therefore substantially flush with first and second side faces of cushion 110.

In response to predetermined conditions, cushion membrane 110 may be deployed with minimized venting, wherein the release device does not release the vent strap 140. This causes tension to be applied to vent strap 140, which gathers vent side panel 132 towards itself and pulls the side panel towards an interior of cushion membrane 110. As a result, the ability of vent 130 to release inflation gas is constricted, and the vent may be described as having adopted a constricted state.

As will be appreciated by those skilled in the art, a variety of types and configurations of seams can be utilized to couple a vent to a cushion membrane without departing from the scope and spirit of the present invention. For example, the seam may be formed by stitching, adhesive, radio frequency welding, heat sealing, or any other suitable technique or combination of techniques.

Figure 3B:
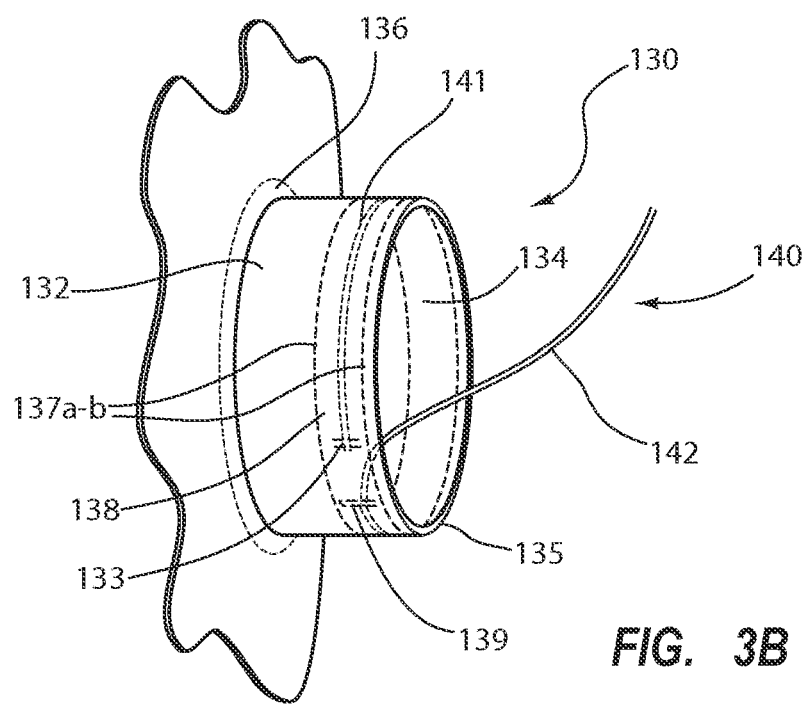
FIG. 3B is a close up perspective view dynamic vent shown in FIG. 3A, wherein the vent is in an open state.

FIG. 3B is a close up perspective view of dynamic vent 130 shown in FIG. 3A, wherein the vent is in the open state, and the relationships between the vent and vent strap 140 are more apparent. First portion 141 of vent strap 140 enters between two layers of vent 130 side panel 132 via strap aperture 139. First portion 141 may circumnavigate a majority of a perimeter of side panel 132 via a strap channel 138, which is formed by seams 137a-b. An end of first portion 141 of vent strap 140 is fixedly attached to side panel 132 via stitching 133, but the rest of the first portion of the vent strap is free to slide within strap channel 138. When tension is applied to strap 140, some of first portion 141 is pulled out of side panel 132 via strap aperture 139. Since the end of first portion 141 is attached to side panel 132 by stitching 133, the side panel, and in particular, rim 135 is gathered towards itself, and the diameter aperture 134 is reduced.

Side panel 132 of vent 130 may be embodied with a height that is sufficient to achieve a predetermined vent aperture 134 diameter when the vent is in the constricted state. In the depicted embodiment, side panel 132 has height which is about half of its diameter. Selecting an appropriate height to diameter ratio and vent tether 140 length permits the cinch tube to adopt the constricted state with little resistance from cushion membrane tension. Also, the height to diameter ratio may determine vent aperture 134 diameter in the constricted configuration and may be manipulated to allow for different aperture diameters in the constricted state. The design permits vent 130 to be a low-stress element in the cushion assembly which is helpful during unfolding of the cushion and pressurization.

In response to predetermined conditions, cushion membrane 110 may be deployed with increased venting, wherein a release device releases vent strap 140. During deployment, inflation gas acts on vent side panel 132 and substantially opens it such that vent aperture 134 comprises a predetermined diameter. Vent panel 132 and/or vent strap 140 may be pushed to the outside of membrane 110 and the vent may be said to have adopted an open state.

As will be appreciated by those skilled in the art, a variety of configurations of vents and vent straps can be utilized to reversibly restrict the ability of a vent to pass inflation gas without departing from the scope and spirit of the present invention. For example, the vent may have any suitable shape such as rectangular, triangular, or polygon shapes. In one embodiment, the vent strap is looped completely through the vent such that one end of the vent strap does not terminate at the vent. Also, the vent strap may not fully circumnavigate the vent side panel, but rather the strap may only partially circumnavigate the side panel. Further, a plurality of vent straps may be disposed at different heights on the vent side panel and the straps may coupled to different release device such that a variety of predetermined conditions result in a variety of levels of inflation gas venting.

Figure 4:
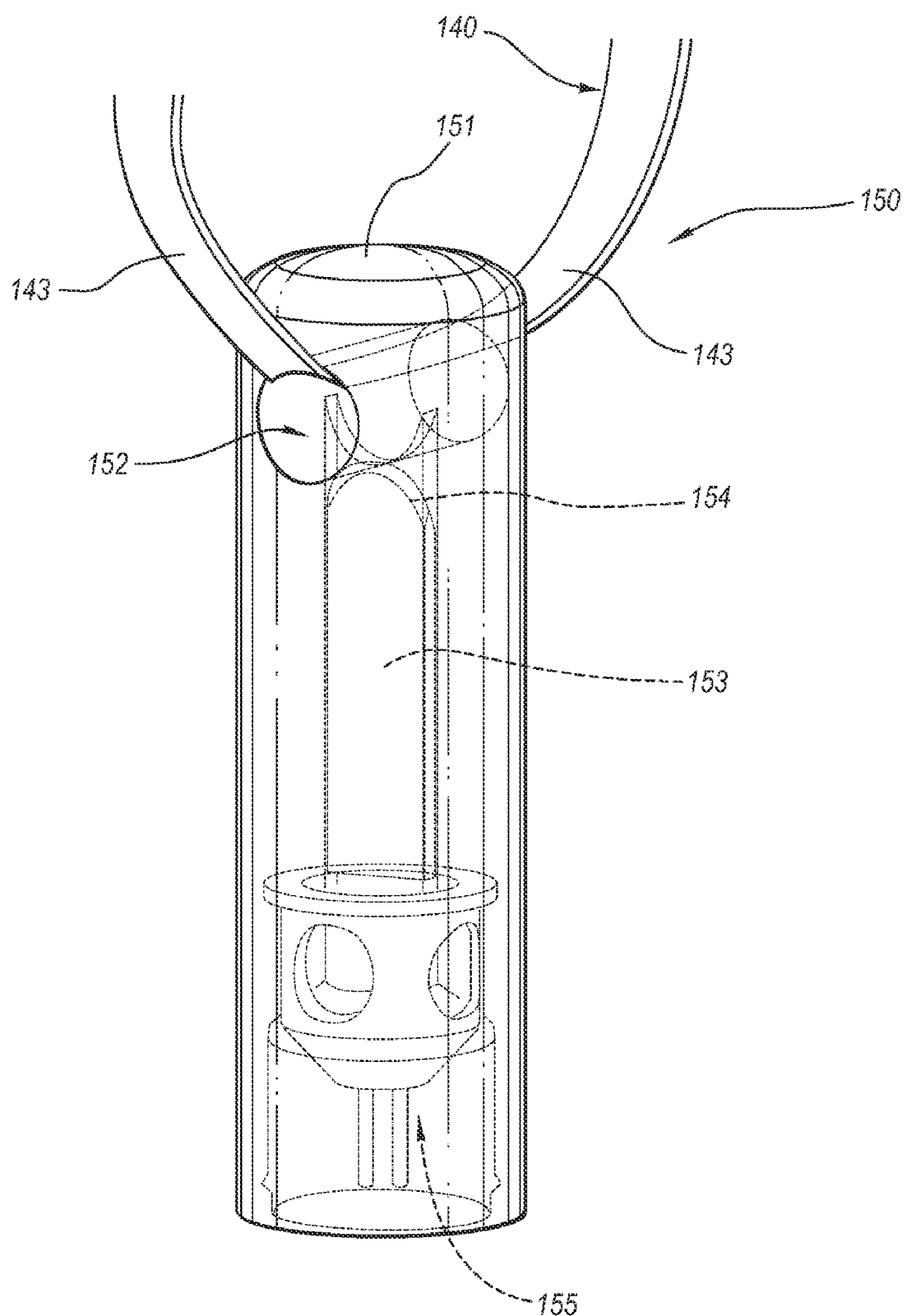
FIG. 4 is a perspective view of the strap release device of the airbag assembly shown in FIG. 1.

FIG. 4 depicts vent strap release device 150 from a perspective view. In the depicted embodiment, release device 150 comprises a strap cutter. Other vent strap cutters and vent strap release device are known in the art, including those disclosed in U.S. patent application Ser. No. 11/154,126 filed on Jun. 16, 2005, and published as U.S. Patent Publication No. 2006/0284404; U.S. Pat. No. 6,932,384; U.S. Pat. No. 7,249,783; and U.S. Pat. No. 6,808,205, which are hereby incorporated by reference. Release device 150 comprises a strap cutter having a body 151, an aperture 152, a blade 153, an edge of the blade 154, and an initiator 155. Third portion 143 of vent strap 140 protrudes through aperture 152 and is retained within the aperture such that the strap may be cut upon airbag deployment and activation of initiator 155. Blade 153 and blade edge 154 are slideably disposed within release device 150 such that upon activation of initiator 155, the blade can slide within body 151 and cut strap 140, thereby releasing the strap.

Figure 5A:
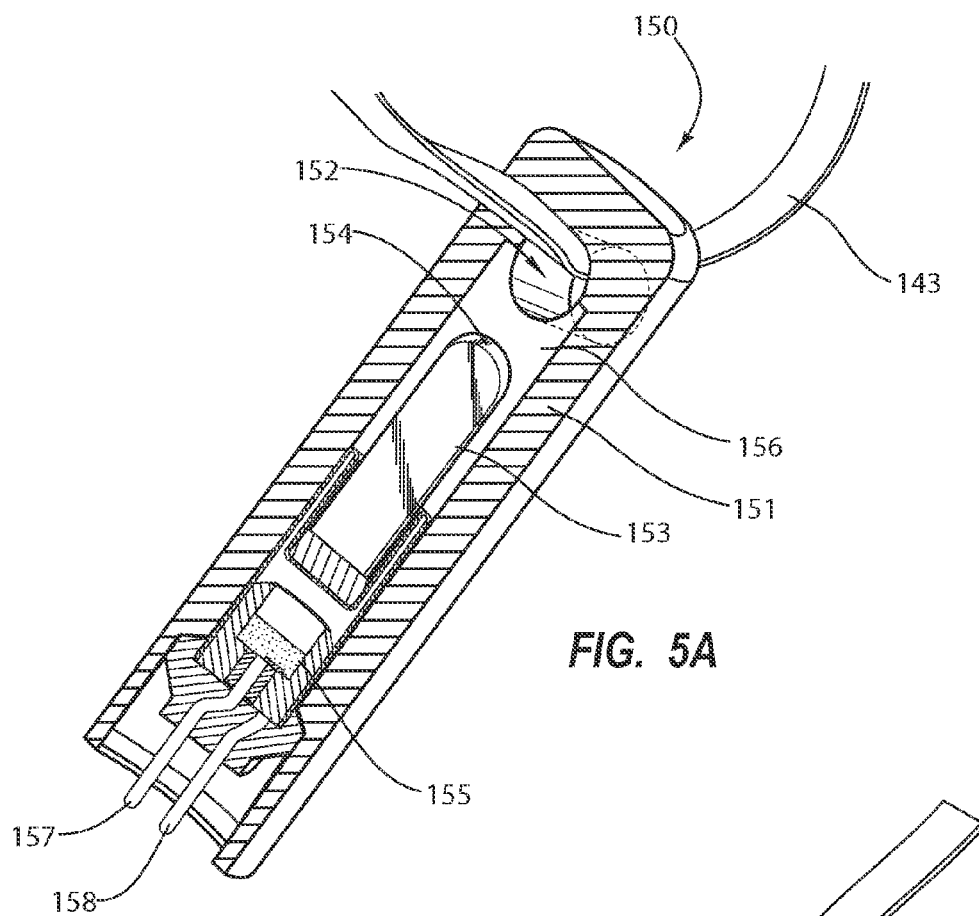
FIG. 5A is a cutaway perspective view of the release device shown in FIG. 4 prior to cutting a vent strap.
Figure 5B:
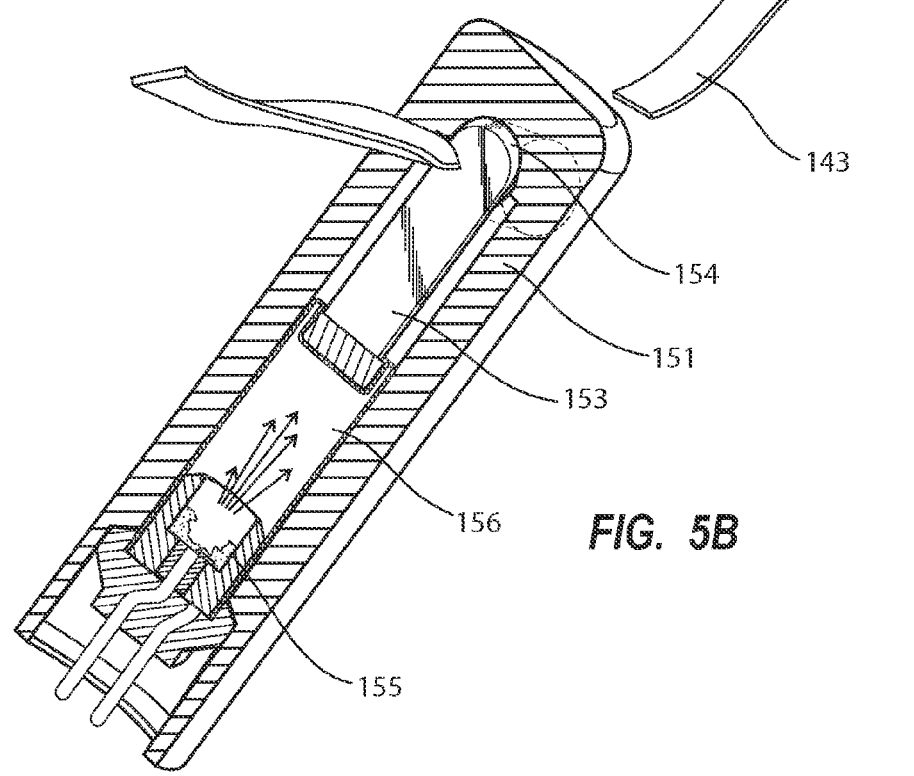
FIG. 5B is a cutaway perspective view of the release device shown in FIG. 5A after cutting a vent strap.

FIGS. 5A and 5B are cutaway perspective views of release device 150 before and after initiator 155 has been activated, thereby cutting and releasing vent strap third portion 143. Initiator 155 may comprise a first wire 157 and a second wire 158 that may be in electronic communication with a sensor, a vehicle computer, or an electric or electronic relay device. Initiator 155 may be activated via signals or electricity from first and second wires 157 and 158. Initiator 155 may comprise an inherent seal such that upon activation of the initiator, pyrotechnic residues are not released outside release device 150. In an alternative embodiment, initiator 155 does not comprise an inherent seal.

Release device 150 may be mounted on a cushion side of an airbag housing, or alternatively, the release device may be located on a non-airbag cushion side of the housing. As depicted in FIG. 5A, the release device 150 comprises a slot 156 that is configured to allow blade 153 to slide within the slot. Upon activation of initiator 155, blade 153 may be pushed upward within slot 156 in the direction of aperture 152 and vent strap third portion 143. Blade 153 may continue to travel axially within slot 156 such that edge of blade 154 enters aperture 152, contacts vent strap third portion 143 and severs the vent strap.

Figure 6A:
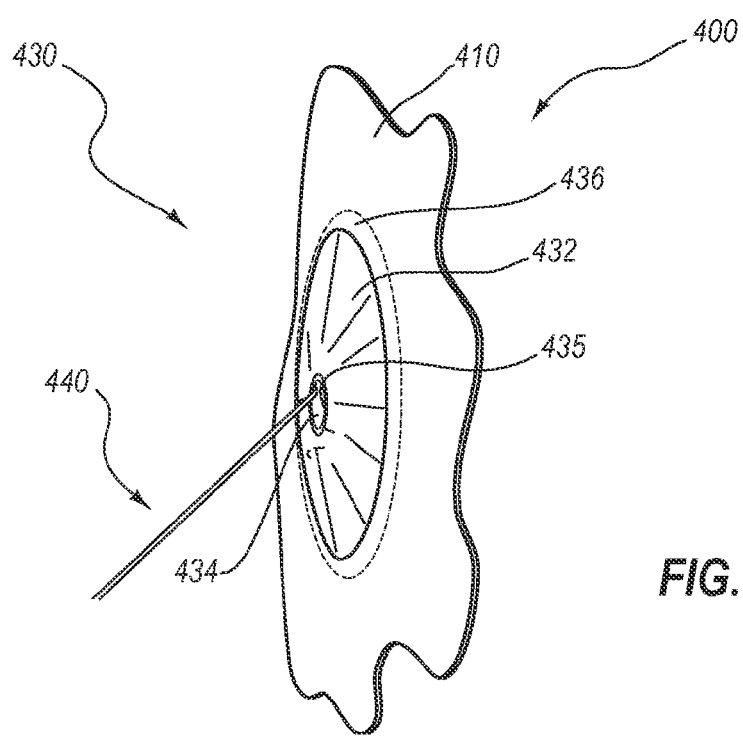
FIG. 6A is a close up perspective view of another embodiment of a dynamic vent, wherein the vent is in a constricted state.
Figure 6B:
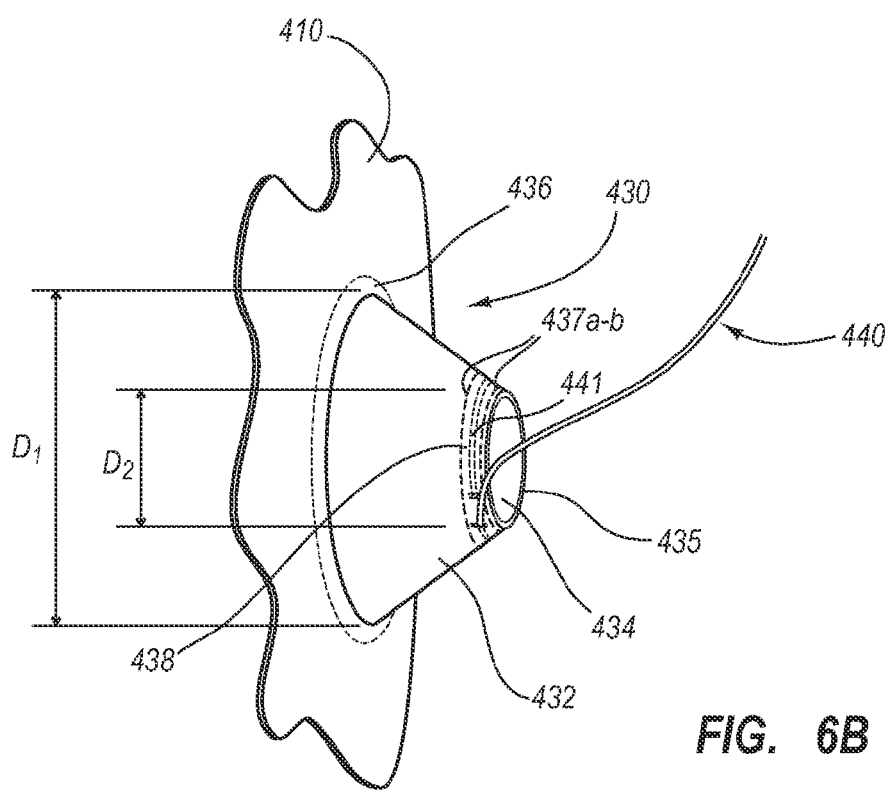
FIG. 6B is a close up perspective view of the dynamic vent of FIG. 4, wherein the vent is in an open state.

FIGS. 6A and 6B are close up perspective views of another embodiment of a dynamic vent 430, wherein the vent is in a constricted state and an open state, respectively. Dynamic vent 430 and a vent strap 440 may comprise components of an inflatable airbag assembly 400. Airbag assembly 400 may comprise similar components and may be configured to function similarly to assembly 100, described herein.

Dynamic vent 430 may be configured similarly and may function similarly to dynamic vent 130, described herein. Vent 430 may be coupled to an airbag cushion membrane 410 via a seam 436 such that a vent aperture 434 is in fluid communication with an aperture in the cushion membrane. A side panel 432 comprises a rim portion 435, which may enclose and be coupled to a first portion 441 of tether 440 within a strap channel 438 that is defined by stitching 437a-b.

During manufacture, assembly, or installation of airbag assembly 400, a third portion of vent strap is coupled to a release device.

In response to predetermined conditions, cushion membrane 410 may be deployed with minimized venting, wherein the release device does not release the vent strap 440. This causes tension to be applied to vent strap 440, which gathers vent side panel 432 towards itself and pulls the side panel towards an interior of cushion membrane 410. As a result, the ability of vent 430 to release inflation gas is constricted, and the vent may be described as having adopted a constricted state.

In a constricted state, as depicted in FIG. 6A, strap 440 is under tension and gathers rim 435 of side panel 432 towards itself, such that vent aperture 434 is constricted, but not closed. Side panel 432 may project towards an inflatable void of cushion 410; however, vent 430 may be described as being substantially flush with cushion membrane 410. The diameter of aperture 434 in the constricted state may be of a predetermined magnitude and may be altered to achieve various levels of inflation gas venting in the constricted state.

FIG. 6B depicts vent 430 in the open state, wherein the shape of side panel 432 can be appreciated. Vent side panel 432 comprises a conical shape, wherein the portion of the panel attached to cushion 410 has a larger diameter, $D_1$, than the diameter of aperture 434, $D_2$. $D_2$ ranges from about 35 mm to about 70 mm. $D_1$ is determined based on what is needed to improve the surface area upon which the positive pressure within the cushion can react against to generate larger forces to quickly open the dynamic vent to the fixed $D_2$. Generally, $D_1$ is, at least two times the diameter of $D_2$. The conical shape of vent 430 is configured to improve the efficiency of the vent changing conformations from the constricted state to the open state. The diameter, $D_1$, of side panel 432 may comprise a larger diameter than side panel 132, and thereby comprises a greater surface area for inflation gas to act upon during the transition from a constricted to an open state.

In response to predetermined conditions, cushion membrane 410 may be deployed with increased venting, wherein a release device releases vent strap 440. During deployment, inflation gas acts on vent side panel 432 and substantially opens it such that vent aperture 434 comprises a predetermined diameter. Vent panel 432 and/or vent strap 440 may be pushed to the outside of membrane 410 and the vent may be said to have adopted an open state.

The airbag membranes 110, 410, disclosed herein are examples of means for cushioning an occupant of a vehicle during a collision event. Furthermore, the dynamic vents 130, 430, disclosed herein are examples of means for venting inflation gas from the interior of an inflatable cushion airbag. The vent straps 140, 440, disclosed herein are examples of means for at least partially closing the closeable vents.

Moreover, the release device 150, disclosed herein is an example of means for releasing the depth and height restraining tethers. Additionally, the various sensors disclosed herein are examples of means for detecting the size or position, or both the size and position of an occupant.

Furthermore, any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the present disclosure to its fullest extent. The examples and embodiments disclosed herein are to be construed as merely illustrative and not a limitation to the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

The invention claimed is:

1. An airbag assembly, comprising:
a cushion membrane that defines an interior of an inflatable airbag cushion, wherein the membrane is coupled to a housing,
   wherein the cushion comprises at least one vent that is configured to vent inflation gas out of the interior of the cushion,
      wherein the vent comprises a side panel comprising a base portion and a rim,
         wherein the base portion is coupled to the cushion membrane and defines a base aperture,
         wherein the rim is opposite from the base portion and defines a rim aperture;
a release device coupled adjacent to the housing, wherein the release device is configured to be activated via an electronic signal that communicates a predetermined condition; and,
a vent strap coupled to the rim of the vent and extending to and coupled to the release device such that the vent strap can transmit tension generated by inflation gas pressing on the cushion membrane to the vent and such that the tension can be released via the release device;
   wherein the assembly is configured such that the vent is initially in a constricted state upon deployment of the cushion, and then based on detection of the predetermined condition, the vent either remains constricted or the vent strap is released by the release device such that the vent is pushed to extend outside of and away from the cushion to be in an open state;
   wherein the inflatable airbag cushion is fully inflated when the vent is in the constricted state and in the open state but becomes less firm when the vent is in the open state;
   wherein the vent strap extends around the rim of the vent such that, when the vent is in the constricted state, the side panel is cinched and the rim is gathered towards itself;
   wherein, when the vent is in the constricted state, the rim aperture has a first diameter, and wherein, when the vent is in the open state, the vent has a second diameter that is larger than the first diameter such that the vent has more capacity to release inflation gas in the open state than in the constricted state;
   wherein the side panel has a length such that, when the vent is in the open state, the vent extends outside of and away from the cushion membrane; and
   wherein, when the vent is in the constricted state, the position and configuration of the side panel permits positive pressure to be exerted against the side panel to generate force to quickly open the vent from the constricted state to the open state when the vent strap has been released.

2. The airbag assembly of claim 1, wherein the cushion membrane lacks a fixed vent.

3. The airbag assembly of claim 1, wherein the vent strap is coupled only to the release device and the rim of the vent.

4. The airbag assembly of claim 1, wherein, when the vent is in the constricted state, the side panel is approximately flush with the cushion membrane.

5. The airbag assembly of claim 1, wherein the vent strap comprises a portion that is releasably coupled to the release device.

6. The airbag assembly of claim 1, wherein the vent strap comprises a portion disposed between two layers of the side panel near the rim such that the strap at least partially circumnavigates the side panel and in the constricted state, the strap gathers the rim of the side panel.

7. The airbag assembly of claim 1, wherein the rim aperture has a diameter of about 15 mm when vent is in the constricted state.

8. The airbag assembly of claim 1, wherein the base aperture has a diameter that is approximately equal to the rim diameter.

9. The airbag assembly of claim 1, wherein the side panel has a height that is about half of the diameter of the base aperture.

10. An airbag assembly comprising:
a cushion membrane that defines an interior of an inflatable airbag cushion, wherein the membrane is coupled to a housing,
wherein the cushion comprises at least one vent that is configured to vent inflation gas out of the interior of the cushion;
wherein the vent comprises a side panel comprising a base portion and a rim,
wherein the base portion is coupled to the cushion membrane and defines a base aperture, and
wherein the rim is opposite from the base portion and defines a rim aperture;
a release device coupled adjacent to the housing, wherein the release device is configured to be activated via an electronic signal that communicates a predetermined condition; and,
a vent strap coupled to the rim of the vent and extending to and coupled to the release device such that the vent strap can transmit tension generated by inflation gas pressing on the cushion membrane to the vent and such that the tension can be released via the release device;
wherein the assembly is configured such that the vent is initially in a constricted state upon deployment of the cushion, and then based on detection of the predetermined condition, the vent either remains constricted or the vent strap is released by the release device such that vent is pushed to extend outside of and away from the cushion to be in an open state;
wherein the inflatable airbag cushion is fully inflated when the vent is in the constricted state and in the open state but becomes less firm when the vent is in the open state;
wherein the vent strap extends around the rim of the vent such that, when the vent is in the constricted state, the side panel is cinched and the rim is gathered towards itself,
wherein, when the vent is in the constricted state, the rim aperture has a first diameter, and wherein, when the vent is in the open state, the vent has a second diameter that is larger than the first diameter such that the vent has more capacity to release inflation gas in the open state than in the constricted state;
wherein the side panel has a length such that, when the vent is in the open state, the vent extends outside of and away from the cushion membrane;
wherein the side panel has a length and configuration such that, when the vent is in a constricted state, positive pressure can be exerted against the side panel to generate force to quickly open the vent from the constricted state to the open state when the vent strap has been released, and
wherein the base aperture has a diameter that is larger than the diameter of rim aperture such that the side panel has a conical shape when the vent is in the open position.

11. The airbag assembly of claim 10, wherein the diameter of the base aperture is at least about twice the diameter of the rim aperture.

12. The airbag assembly of claim 10, wherein, when the vent is in the constricted state, the side panel is approximately flush with the cushion membrane.

13. The airbag assembly of claim 10, wherein the cushion membrane lacks a fixed vent.

14. The airbag assembly of claim 10, wherein the vent strap is coupled only to the release device and the rim of the vent.

* * * * *